(No Model.)

B. F. RITCHIE.
PIPE COUPLING.

No. 338,783. Patented Mar. 30, 1886.

Witnesses:
J. A. Herron
N. E. Harrison

Inventor
Benjamin F. Ritchie
Per O. D. Levis
Attorney

UNITED STATES PATENT OFFICE.

BENJAMIN F. RITCHIE, OF PITTSBURG, PENNSYLVANIA, ASSIGNOR OF ONE-HALF TO JEFFERSON STALEY, OF SAME PLACE.

PIPE-COUPLING.

SPECIFICATION forming part of Letters Patent No. 338,783, dated March 30, 1886.

Application filed February 20, 1886. Serial No. 192,706. (No model.)

*To all whom it may concern:*

Be it known that I, BENJAMIN F. RITCHIE, a citizen of the United States, residing at Pittsburg, in the county of Allegheny and State of Pennsylvania, have invented certain new and useful Improvements in Expansion-Joints; and I do hereby declare the following to be a full, clear, and exact description of the invention, such as will enable others skilled in the art to which it pertains to make and use the same, reference being had to the accompanying drawings, which form a part of this specification.

My invention relates to an improvement in expansion pipe-joints, the object being to provide a pipe-joint that will expand or contract in different degrees of temperature without injury to the line of pipe; and with this end in view my invention consists in certain details of construction and combination of parts, as will be more fully described hereinafter.

Figure 1:
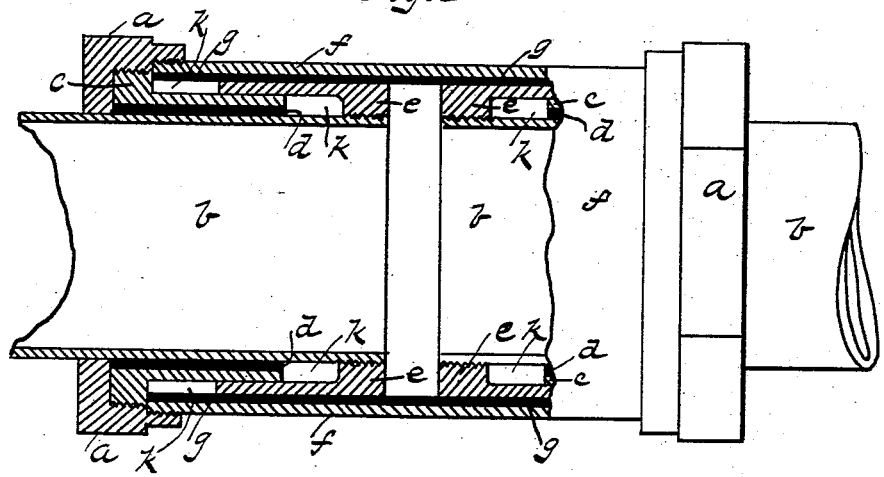
Figure 2:
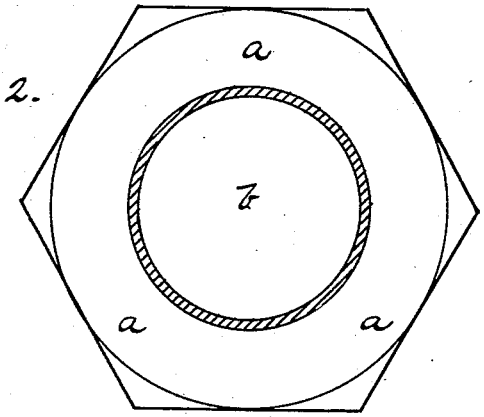

In the accompanying drawings, Figure 1 is a sectional elevation of my improved expansion-joint, partly shown in outside elevation. Fig. 2 is an end view of the same.

To put my invention into practice, I provide two large double-threaded nuts, $a$, and place the same over the pipes $b$. Into these nuts $a$ I screw thimbles $c$, which are somewhat larger in diameter than the pipes $b$, leaving a space, into which is placed a suitable packing, $d$. I next secure thimbles $e$, somewhat similar in construction, but larger in diameter, and turned to fit neatly about the first mentioned, to the ends of the pipes $b$. I now surround these thimbles $c$ $e$ by a casing, $f$, the diameter of which is such as to leave an intervening space, in which I place packing $g$. I now screw the nuts $a$ to the ends of the casing $f$, which completes the joint.

The packing $d$ $g$ may be of any suitable material; but I prefer it to be composed of a mixture of gum-arabic, shellac, and cement.

Should the line of pipes $b$ expand, the two thimbles $c$ $e$ have sufficient space, $k$, to move toward each other, and when the pipes $b$ contract they separate. The packing $d$ $g$, together with the threaded joints, prevents the gas or liquid traveling through the pipes $b$ from escaping.

Having thus described my invention, what I claim, and desire to secure by Letters Patent, is—

In a line of pipe, $b$, the combination of the nuts $a$, having secured thereto thimbles $c$ and suitable packing, $d$, the thimbles $e$, overlapping those before mentioned, fitting neatly about the same, and secured to the ends of the pipes $b$, the outside casing, $f$, having an inner lining of packing, $g$, substantially as shown and described.

BENJAMIN F. RITCHIE.

Witnesses:
   H. T. MORRIS,
   JOSIAH W. ELLS.